United States Patent
Ghoneim

(10) Patent No.: US 8,301,340 B2
(45) Date of Patent: Oct. 30, 2012

(54) METHOD AND APPARATUS FOR JOINTLY CONTROLLING MULTIPLE DEVICES

(75) Inventor: Youssef Ghoneim, Torslanda (SE)

(73) Assignee: GM Global Technology Operations LLC, Detroit, MI (US)

( * ) Notice: Subject to any disclaimer, the term of this patent is extended or adjusted under 35 U.S.C. 154(b) by 501 days.

(21) Appl. No.: 12/532,121

(22) PCT Filed: Mar. 14, 2008

(86) PCT No.: PCT/EP2008/002080
§ 371 (c)(1),
(2), (4) Date: Feb. 11, 2010

(87) PCT Pub. No.: WO2008/113530
PCT Pub. Date: Sep. 25, 2008

(65) Prior Publication Data
US 2010/0145577 A1    Jun. 10, 2010

(30) Foreign Application Priority Data

Mar. 21, 2007   (WO) ................. PCT/EP2007/002511

(51) Int. Cl.
*B60W 10/00* (2006.01)
*G06F 19/00* (2006.01)
(52) U.S. Cl. .............. 701/41; 701/36; 701/48
(58) Field of Classification Search .......... 701/41, 701/36, 48, 1; 717/168
See application file for complete search history.

(56) References Cited

U.S. PATENT DOCUMENTS

| | | | |
|---|---|---|---|
| 5,095,417 A | 3/1992 | Hagiwara et al. | |
| 5,283,749 A | 2/1994 | Tanahashi | |
| 5,410,477 A | 4/1995 | Ishii et al. | |
| 5,513,107 A | 4/1996 | Gormley | |
| 8,032,878 B2 * | 10/2011 | Nakagaki | 717/168 |
| 8,108,083 B2 * | 1/2012 | Kameyama | 701/1 |
| 2003/0191568 A1 * | 10/2003 | Breed | 701/36 |
| 2006/0167565 A1 | 7/2006 | Katrak | |

* cited by examiner

Primary Examiner — Tan Q Nguyen
(74) Attorney, Agent, or Firm — Ingrassia Fisher & Lorenz, P.C.

(57) ABSTRACT

A method is provided for jointly controlling a plurality n, n being an integer greater than 1, of devices connected to a same communication channel, each of said devices $D_l$, l=1, ..., n, being capable of assuming a number $m_l$ of states. The method includes, but is not limited to unambiguously assigning to each combination of states of said n devices an integer code number M, wherein $$M \in [x, x + \prod_{l=1}^{n} m_l[,$$

x being an arbitrary number, for a combination of states to be set in the devices, selecting the code number M assigned to said combination (m5), broadcasting (m2) said code number M to all devices $D_l$, l=1, ..., n via said communication channel; decoding (s2), in each device, the state to be set in that device from said code number M; setting (s3) the decoded state in each device.

22 Claims, 2 Drawing Sheets

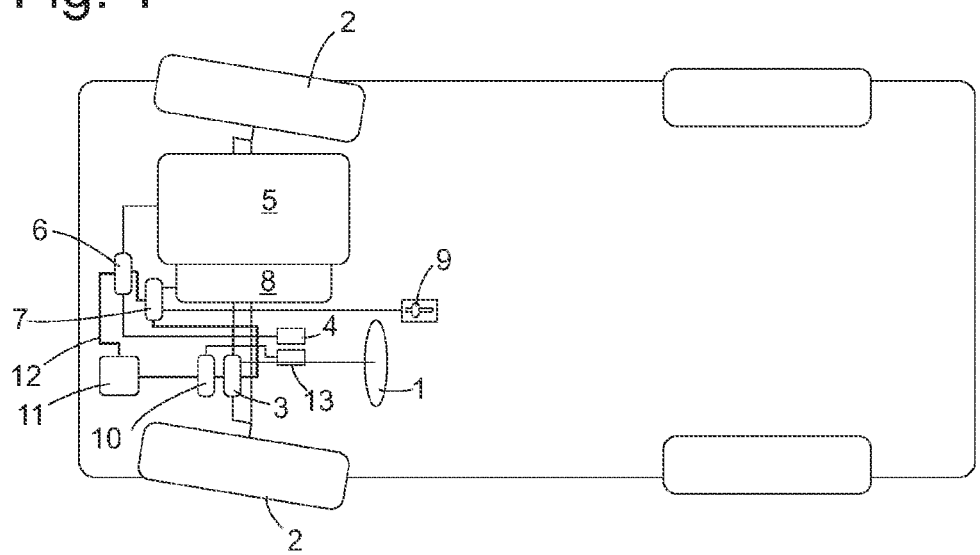
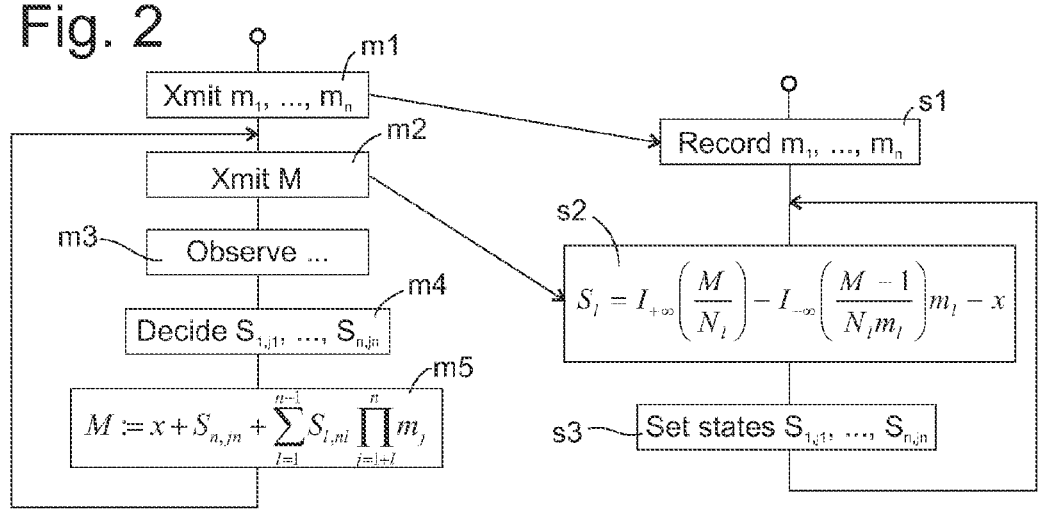

Fig. 3

$S_1=0$          $S_2=2$          $S_3=1$
$m_1=4$          $m_2=3$          $m_3=4$ $$M := x + S_{n,jn} + \sum_{l=1}^{n-1} S_{l,nl} \prod_{j=l+l}^{n} m_j, \quad n=3, \quad x=1$$

$$M = 1+1+0+2*4 = 10$$

---

$$
\begin{aligned}
N_1 &= 3*4 = 12 \\
N_2 &= 4 \\
N_3 &= 1 \\
S_1 &= I_{+\infty}\left(\frac{10}{12}\right) - I_{-\infty}\left(\frac{9}{48}\right) * 4 - 1 = 0 \\
S_2 &= I_{+\infty}\left(\frac{10}{4}\right) - I_{-\infty}\left(\frac{9}{12}\right) * 3 - 1 = 2 \\
S_3 &= I_{+\infty}\left(\frac{10}{1}\right) - I_{-\infty}\left(\frac{9}{4}\right) * 4 - 1 = 1
\end{aligned}
$$

METHOD AND APPARATUS FOR JOINTLY CONTROLLING MULTIPLE DEVICES

CROSS-REFERENCE TO RELATED APPLICATIONS

This application is a U.S. National-Stage entry under 35 U.S.C. §371 based on International Application No. PCT/EP2008/002080, filed Mar. 14, 2008, which was published under PCT Article 21(2) and which claims priority to PCT Application No. PCT/EP2007/002511, filed Mar. 21, 2007, which are all hereby incorporated in their entirety by reference.

TECHNICAL FIELD

The present invention relates to a method and to apparatus for jointly controlling multiple devices, in particular for controlling various subsystem in a motor vehicle.

BACKGROUND

In recent years, a large variety of control subsystems for motor vehicles have been developed which assist the driver in different respects. A well-known type of control subsystem is an automatic brake control, which detects variations between rotating speeds of the wheels of a vehicle and controls braking force applied to the wheels so as to prevent these from slipping. Another prior art control subsystem known as ESP, electronic stability program, detects a steering wheel angle corresponding to a track curvature desired by the driver, compares it to an actual track curvature and, in case of a substantial discrepancy, brakes certain wheels in order to have the vehicle follow the desired track. Another control subsystem may adapt the damping efficiency of the vehicle suspension to the driving situation, so that, for example, the vehicle occupants may experience a feeling of cruising gently while driving at high speed on a smooth, straight lane, while providing a more direct feedback to the driver while driving, for example, off road.

In order to provide a comfortable driving experience, and, most of all, to enable safe driving, operating states of these various control subsystems must be adapted to each other. If instructions to switch over from one state to another are sent successively to the various subsystems, the subsystems may temporarily be in a combination of states which is ill-adapted to the current driving situation. In order to avoid such a situation, one might consider sending to each subsystem an instruction specifying not only the state which the subsystem is to assume but also a delay after which the changeover to the specified state is to happen, so that instructions may be sent to the subsystems one after the other, but once all instructions have been sent, the changeover can be carried out at the same time in all subsystems. However, for such a scheme to work, the delay must at least be long enough to allow instructions to be sent to each subsystem. Accordingly, there may be a considerable delay between the instant in which a new combination of states for the control subsystems is decided and the instant in which the control subsystems indeed switched over to the new states. This delay is the longer the higher the number of subsystems is, so that it is extremely difficult to integrate new subsystems on an existing platform. Further, the length of the delay must be known before the first instruction is transmitted to a subsystem.

At least one object of the present invention is, therefore, to provide a method and apparatus for jointly controlling a plurality of devices which allow to send instructions specific to each of the said devices simultaneously to all of these devices. In addition, other objects, desirable features, and characteristics will become apparent from the subsequent summary and detailed description, and the appended claims, taken in conjunction with the accompanying drawings and this background.

SUMMARY

This object is achieved by a method, a vehicle control unit, a vehicle subcontrol unit, by a computer program product, and by a data carrier.

According to an embodiment of the invention, a plurality n, n being an integer greater than 1, of devices, in particular vehicle subcontrol units, connected to a same communication channel, each device $D_l$, l=1, ..., n being capable of assuming a number $m_l$ of states, comprises the steps of:

unambiguously assigning to each combination of states of said n devices an integer code number M, wherein $$M \in [x, x + \prod_{l=1}^{n} m_l[,$$

x being an arbitrary number;

for a combination of states to be set in the devices, selecting the code number M assigned to said combination;

broadcasting said code number M to all devices $D_l$, l= 1, ..., n via said communication channel;

decoding, in each device, the state to be set in that device from said code number M; and setting the decoded state in each device.

Since the total number of possible combinations is $$\prod_{l=1}^{n} m_l,$$

the fact that M is in the interval $$[x, x + \prod_{l=1}^{n} m_l[$$

implies that each integer in $$\left[x, x + \prod_{l=1}^{n} m_l\right[$$

has a combination of states unambiguously assigned to it.

The number of states supported by each device is arbitrary, in particular there may be at least one device, the number of states of which is divisible by a prime number larger than 2.

According to a preferred embodiment, the $m_l$ states of each device $D_l$, l=1, ..., n are assigned integer indices $S_{l,j}=y_l, y_l+1, ..., y_l+m_l-1$, wherein $y_l$ is an arbitrary integer, preferably 0 or 1, and in step a), each combination of states $\{S_{1,j1}, S_{2,j2}, ..., S_{n,jn}\}$ is assigned a code number $$M = x + S_{n,jn} - y_n + \sum_{l=1}^{n-1} (S_{l,jl} - y_l) \prod_{j=1+l}^{n} m_j. \quad (1)$$

This code number may conveniently be decoded in each device $D_l$ by calculating $$S_{l,jl} = y_l + I_{+\infty}\left(\frac{M+1-x}{N_l}\right) - I_{-\infty}\left(\frac{M-x}{N_l m_l}\right) m_l - 1, \quad (2)$$

where $I_{+\infty}(a)$ is the integer nearest to a which is greater than or equal to a, $I_{-\infty}(a)$ is the integer nearest to a which is smaller than or equal to a, and $$N_l = \begin{cases} \prod_{k=l+1}^{n} m_k & \text{if } k < n \\ 1 & \text{if } k = n. \end{cases}$$

In this way, each device can find out the index of the state it is to assume independently from the other devices. Further, the method is easily adaptable to different versions of the devices supporting different numbers of states, since all a given device has to know about the other devices for correctly decoding the received code word M is the number of states supported by the devices.

By further providing an initialising step of transmitting to each device $D_l$ the state numbers of at least each other device $D_l, \ldots, D_{l-1}, D_{l+1}, \ldots, D_n$, it is possible to replace or modify individual devices; for ensuring a correct decoding of the code word, it is sufficient that the state number of a modified device is made known to the other devices.

This can be achieved quickly and simply by broadcasting the state numbers $M_n$ of all devices $D_l, \ldots, D_n$.

BRIEF DESCRIPTION OF THE DRAWINGS

The present invention will hereinafter be described in conjunction with the following drawing figures, wherein like numerals denote like elements, and.

FIG. 1 is a schematic diagram of a motor vehicle in which the present invention is implemented;

FIG. 2 is a flowchart of an embodiment of the method of the invention; and

FIG. 3 illustrates a specific example of carrying out the method.

DETAILED DESCRIPTION

The following detailed description is merely exemplary in nature and is not intended to limit application and uses. Furthermore, there is no intention to be bound by any theory presented in the preceding background and summary or the following detailed description.

FIG. 1 is a schematic diagram of a motor vehicle illustrating in block form some components which are relevant to the present invention. It should be understood that these components are not necessarily essential to the invention, and that the invention may be applicable to other components that those shown, too.

A steering wheel 1 controls the steering angle of front wheels 2 of the motor vehicle by means of a power steering controller 3. The power steering controller 3 has actors for turning the front wheels 2 in proportion to the angular position of steering wheel 1, and actors for exercising on the steering wheel 1, a counter-torque to a torque imposed by the driver. The power steering controller 3 supports a plurality of operating states which differ from each other by the degree of assistance provided to the driver, i.e., by the proportion between the force required for turning the front wheels 2 and the counter-torque experienced by the driver. The power steering controller 3 further has a so-called Active Front Steering functionality, i.e., it supports a number of states having different ratios between the angle by which the driver turns steering wheel 1 and the corresponding yaw angle of the front wheels 2.

An accelerator pedal 4 controls the load of an engine 5 via an electronic engine controller 6. Engine controller 6 supports a plurality of states which use different characteristics for controlling the motor load as a function of the accelerator pedal position. For example, there may be a "calm" state in which the load varies little with the pedal position, and there may be a "nervous" state in which the load varies strongly with the pedal position.

A transmission controller 7 controls a gearbox 8 based primarily on engine load and speed detected by sensors, not shown, at engine 5. A gearshift lever 9 is connected to the transmission controller 7, so as to enable the driver to choose between different states of the transmission controller 7, which use different algorithms for selecting the gear ratio in gearbox 8 based on engine speed and load, or for overriding a gear ratio selected by transmission controller 7.

The transmission controller 7 may also be adapted to switch over between a two-wheel drive state and a four-wheel drive state, either based on the input from the driver or automatically, based, for example, on driving speed.

Electronic brake controller 10 controls the reaction of brakes, not shown, provided at the vehicle wheels, to the driver pressing a brake pedal 13. The brake controller 10 may implement conventional brake control schemes such as an anti-blocking system or an electronic stability program, and different states of the brake controller 10 may vary in the amount of wheel slippage permitted before the anti-blocking system or the ESP is activated.

A suspension controller, not shown, is provided for controlling the stiffness of the vehicle's wheel suspension, different states of the suspension controller corresponding to different degrees of rigidity it imposes upon shock absorbers of the wheels.

All these controllers 3, 6, 7, 10 are connected as sub-controllers or slave controllers to a master controller 11 by a bus system 12.

The bus system 12 may have a linear structure in which all controllers are connected in parallel to a same bus line and data transmitted on the bus by one of the controllers are received in parallel by all others.

In FIG. 1, the bus system 12 is shown to have an annular structure with bus segments extending from master controller 11 to engine controller 6, from engine controller 6 to transmission controller 7, and so on, and finally, from brake controller 10 back to master controller 11. In such a bus system, the master controller 11 can judge that data sent by it were received correctly by all other controllers, if these data, after making a complete turn on the bus system 12, are received uncorrupted at the master controller 11 again.

The task of the master controller 11 is to coordinate the various states the sub-controllers 3, 6, 7, 10 can assume based on direct input from the driver, on his driving behaviour, road conditions, or the like. Since not all possible combinations of states of the various sub-controllers ensure a harmonic driving behaviour of the vehicle, it may be necessary to change the states of several controllers simultaneously. An operating method of master controller 11 and an arbitrary one of sub-controllers 3, 6, 7, 10 by which this goal is achieved is described referring to the flowchart of FIG. 2. The method may be implemented by appropriately programming data processing devices which embody the various controllers 3, 6, 7, 10, 11.

In FIG. 2, it is assumed that the number of sub-controllers $D_l$ is n, and that each sub-controller $D_l$ supports a plurality $m_l$, l=1, ..., n of states. In an initialising step m1, the master controller 11 broadcasts the complete set of state numbers $m_1, \ldots, m_n$ to all sub-controllers. Each sub-controller, in step s1, receives the set of state numbers $m_1, \ldots, m_n$ and records these in a local memory.

The initialising steps m1, s1 can be carried out whenever the engine is started, or only if modifications to the control system have been carried out, which might have modified the state number $m_1, \ldots, m_n$ of any of the sub-controllers or the total number n of the sub-controllers. The total number n may also be broadcast in step m1, but this is not compulsory, since the sub-controllers can tell the number n by counting the state numbers $m_1, \ldots, m_n$ received.

The master controller then broadcasts a code number M in step m2. The term "broadcast" is used here to specify that although the bus system 12 is capable of transmitting data accompanied by an address so that they will be taken account of only by the controller to which they are addressed, broadcast data are received and taken account of by all sub-controllers, so that these data need not to be transmitted more than once.

At this time, the code number M can be a default code number specifying a set of states of the sub-controllers which is appropriate for low speed driving and accelerating. Alternatively, it might specify the states in which the sub-controllers were before turning off the engine 5. The master controller 11 then, in step m3, observes for a certain time the behaviour of the driver, for example, the frequency and intensity of accelerating and/or braking, road conditions (e.g., roughness, slipperiness etc.), and based on these observations, decides in step m4 on a combination of states $S_{1,j1}, \ldots, S_{n,jn}$, of the various sub-controllers which is suited to the driver's requirements and to the road conditions.

Each of these states has an integer index associated to it, which will be referred to here by $S_{l,jl}$, l=1, ..., n, too. For the sake of convenience, it will be assumed that these indices can take integer values 0, 1, ..., $m_l-1$. In that case, a code number M is calculated in step m5 for the selected combination of states based on the following formula:

$$M = x + S_{n,jn} + \sum_{l=1}^{n-1} S_{l,nl} \prod_{j=1}^{n-l} m_j$$

It should be noted here that the indices assigned to the states of device $D_l$ might as well begin not with 0 but with an arbitrary integer $y_l$, l=1, ..., n. In that case, a code number can be calculated according to the formula:

$$M = x + (S_{n,jn} - y_n) + \sum_{l=1}^{n-1} (S_{l,nl} - y_l) \prod_{j=1}^{n-l} m_j$$

What is important is that for the lowest numbered index $S_{l,nl}$, the term $(S_{l,nl}-y_l)$ is 0, in order to ensure that the possible combinations of states of the various sub-controllers are assigned to consecutive integer numbers M.

After calculating the code number M, the method returns to step m2, and the code number M is broadcast to the sub-controllers.

Decoding of the code number M in each of the sub-controllers is carried out in step S2 according to the formula $$S_{L,jl} = y_l + I_{+\infty}\left(\frac{M+1-x}{N_l}\right) - I_{-\infty}\left(\frac{M-x}{N_l m_l}\right) m_l - 1, \quad (2)$$

where
$I_{+\infty}(a)$ is the integer nearest to a which is greater than or equal to a,
$I_{-\infty}(a)$ is the integer nearest to a which is smaller than or equal to a, and $$N_l = \begin{cases} \prod_{k=l+1}^{n} m_k & \text{if } l < n \\ 1 & \text{if } l = n. \end{cases}$$

In the case of $x=y_l=1$ for all l=1, ..., n, eq. (2) reduces to $$S_{L,jl} = I_{+\infty}\left(\frac{M}{N_l}\right) - I_{-\infty}\left(\frac{M-1}{N_l m_l}\right) m_l \quad (3)$$

Although all sub-controllers use the same decoding formula (2) or (3), the result of the decoding is specific to each sub-controller and depends on the number 1 assigned to it. Since these numbers need not change in the lifetime of the vehicle, they can be wired in each of the sub-controllers.

Equivalently, decoding may be carried out using the formula $$S_{L,jl} = y_l + I_{-\infty}\left(\frac{M-x}{N_l}\right) \bmod m_l \quad (4)$$

Or, in case of $x=y_l=0$, $$S_{L,jl} = I_{-\infty}\left(\frac{M}{N_l}\right) \bmod m_l, \quad (5)$$

wherein mod denotes the modulo operator, i.e. a mod b is the remainder of an integer division of a by b.

A further equivalent way of decoding is to use the formula $$S_{L,jl} = y_l + I_{-\infty}\left(\frac{M-x}{N_l}\right) - I_{-\infty}\left(\frac{M-x}{N_l m_l}\right) m_l - 1, \quad (6)$$

which, for $x=y_l=0$, reduces to $$S_{l,jl} = I_{-\infty}\left(\frac{M}{N_l}\right) - I_{-\infty}\left(\frac{M}{N_l m_l}\right)m_l \quad (7)$$

A numerical example of the encoding and decoding procedure is given referring to FIG. 3. For example it is assumed that three sub-controllers D1, D2, D3 exist, supporting $m_1=4$, $m_2=3$ and $m_3=4$ states, respectively. If arbitrary constants $x$, $y_l$ are set to 1, selecting states $S_1=1$, $S_2=3$ and $S_3=2$ gives a code number M=10.

In the sub-controllers, divisors, $N_1=12$, $N_4=4$, $N_3=1$ are calculated. Since for l>1, $N_l$ depends on the number of states supported by sub-controllers $D_k$, $k \neq l$, $N_l$ is not wired, so that it can easily be updated in all sub-controllers if the number of states of one of the sub-controllers is changed.

Based on these different divisors, sub-controller $D_l$ calculates $S_1=0$, $D_2$ calculates $S_2=2$, and $D_3$ calculates $S_3=1$. In this way, each sub-controller derives from the same code number M the state which it is to assume. Since the code number M is available at the same time at all sub-controllers, switching of their respective states in step s3 is easily synchronized.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

The invention claimed is:

1. A method for jointly controlling a plurality n, n being an integer greater than 1, of devices connected to a same communication channel, each of said devices $D_l$, l=1, ..., n, being capable of assuming a number $m_l$ of states, the method comprising the steps of:

unambiguously assigning to each combination of states of said n devices an integer code number M, wherein $$M \in [x, x + \prod_{l=1}^{n} m_l[,$$

x being an arbitrary number;

for a combination of states to be set in the devices, selecting the code number M assigned to said combination (m5);

broadcasting (m2) said code number M to all devices $D_l$, l=1, ..., n via said communication channel;

decoding (s2), in each device, the state to be set in that device from said code number M; and setting (s3) the decoded state in each device.

2. The method of claim 1, wherein the number $m_l$ of states of at least one of said devices is divisible by a prime number larger than 2.

3. The method of claim 1, in which the states of all devices $D_l$, l=1, ..., n are assigned integer indices $S_{l,jl}=0, 1, ..., m_l$, and in step a), each combination $\{S_{1,j1}, S_{2,j2}, S_{n,jn}\}$ is assigned a code number $$M = x + S_{n,jn} - y_n + \sum_{l=1}^{n-1}(S_{l,jl} - y_l)\prod_{j=1+l}^{n} m_j,$$

wherein x, $y_l$ are integers.

4. The method of claim 3, wherein a device $D_l$ in said decoding step decodes (s2) a received code word M by calculating according to:

$$S_{l,jl} = y_l + I_{+\infty}\left(\frac{M+1-x}{N_l}\right) - I_{-\infty}\left(\frac{M-x}{N_l m_l}\right)m_l - 1,$$

where:

$I_{+\infty}(a)$ is the integer nearest to a which is greater than or equal to a, $I_{-\infty}(a)$ is the integer nearest to a which is smaller than or equal to a, and:

$$N_l = \begin{cases} \prod_{k=l+1}^{n} m_k & \text{if } l < n \\ 1 & \text{if } l = n. \end{cases}$$

5. The method of claim 4, further comprising an initializing step of transmitting (m1) to each device $D_l$ the state numbers of at least each other device $D_1, ..., D_{l-1}, D_{l+1}, ..., D_n$.

6. The method of claim 5, wherein the initializing step (m1) comprises broadcasting the state numbers $m_l$ of all devices $D_1, ..., D_n$.

7. The method of claim 3, wherein a device $D_l$ in said decoding step decodes (s2) a received code word M by calculating according to:

$$S_{l,jl} = y_l + I_{-\infty}\left(\frac{M-x}{N_l}\right)\bmod m_l$$

where:

$I_{+\infty}(a)$ is the integer nearest to a which is greater than or equal to a, $I_{-\infty}(a)$ is the integer nearest to a which is smaller than or equal to a, and:

$$N_l = \begin{cases} \prod_{k=l+1}^{n} m_k & \text{if } l < n \\ 1 & \text{if } l = n. \end{cases}$$

8. The method of claim 3, wherein a device $D_l$ in said decoding step decodes (s2) a received code word M by calculating according to:

$$S_{l,jl} = y_l + I_{-\infty}\left(\frac{M-x}{N_l}\right) - I_{-\infty}\left(\frac{M-x}{N_l m_l}\right)m_l - 1$$

where:

$I_{+\infty}(a)$ is the integer nearest to a which is greater than or equal to a, $I_{-\infty}(a)$ is the integer nearest to a which is smaller than or equal to a, and:

$$N_l = \begin{cases} \prod_{k=l+1}^{n} m_k & \text{if } l < n \\ 1 & \text{if } l = n. \end{cases}$$

9. The method of claim 1, wherein at least one of the devices is a vehicle subcontrol unit.

10. The method of claim 9, wherein the vehicle control unit is an all wheel drive controller, at least one state of which corresponds to an all-wheel drive mode being on, and at least one state of which corresponds to the all-wheel drive mode being off.

11. The method of claim 9, wherein the vehicle control unit is a shock absorber controller, states of which correspond to different degrees of shock damping.

12. The method of claim 9, wherein the vehicle control unit is a power steering controller, states differ by the degree of provided driver assistance.

13. The method of claim 9, wherein the vehicle control unit is a steering controller, states of which have different relations between steering wheel and front wheel turning angles.

14. The method of claim 9, wherein the vehicle control unit is a powertrain controller, states of which have different gear shifting characteristics.

15. The method of claim 9, wherein the vehicle control unit is a load controller for controlling motor load according to an accelerator pedal position, states of which correspond to different pedal position/load characteristics.

16. The method of claim 9, wherein the vehicle control unit is a brake controller.

17. A vehicle control unit for controlling a plurality of subcontrol units $D_l$, l=1, . . . , n, comprising a selector means for selecting, for each of said subcontrol units a state from a plurality of states supported by said subcontrol unit the states of all subcontrol units $D_l$, l=1, . . . , n having integer indices $S_{l,jl}$, jl=0, 1, . . . , $m_l$, assigned to them, and for determining a code number according to:

$$M = x + S_{n,jn} - y_n + \sum_{l=1}^{n-1} (S_{l,jl} - y_l) \prod_{j=1+l}^{n} m_j;$$

corresponding to the selected states, wherein x, $y_l$ are integers, and broadcast for broadcasting the code number M.

18. The vehicle control unit of claim 17, further comprising a transmitter to transmit to a subcontrol unit the number of states supported by at least all other subcontrol units.

19. The vehicle control unit of claim 18, wherein the means for transmitting are broadcasting means for broadcasting the number of states supported by all subcontrol units.

20. A vehicle subcontrol unit, comprising:
a receiver means for receiving a code number M;
a decoder for calculating a state number according to:

$$S_{l,jl} = y_l + I_{+\infty}\left(\frac{M+1-x}{N_l}\right) - I_{-\infty}\left(\frac{M-x}{N_l m_l}\right) m_l - 1,$$

from said code number M,
where
$I_{+\infty}(a)$ is the integer nearest to a which is greater than or equal to a,
$I_{-\infty}(a)$ is the integer nearest to a which is smaller than or equal to a,
x, $y_l$ are integers and:

$$N_l = \begin{cases} \prod_{k=l+1}^{n} m_k & \text{if } k < n \\ 1 & \text{if } k = n, \end{cases}$$

and a state setting for setting the subcontrol unit to the state specified by said state number.

21. The vehicle subcontrol unit of claim 20, in which the receiver is further adapted to receive the parameters $m_k$.

22. A computer readable medium embodying a computer program product, said computer product comprising:
a control program, the control program configured to jointly control a plurality n, n being an integer greater than 1, of devices connected to a same communication channel, each of said devices $D_l$, l=1, . . . , n, being capable of assuming a number $m_l$ of states, the control program further configured to:
unambiguously assign to each combination of states of said n devices an integer code number M, wherein $$M \in [x, x + \prod_{l=1}^{n} m_l[,$$

x being an arbitrary number;
for a combination of states to be set in the devices, select the code number M assigned to said combination (m5);
broadcast (m2) said code number M to all devices $D_l$, l=1, . . . , n via said communication channel;
decode (s2), in each device, the state to be set in that device from said code number M; and
set (s3) the decoded state in each device.

* * * * *